US012675581B2

(12) United States Patent
Taneja et al.

(10) Patent No.: US 12,675,581 B2
(45) Date of Patent: Jul. 7, 2026

(54) SYSTEM AND METHOD FOR GENERATING DYNAMIC CYBER THREAT MODELS BASED ON APPLICATION ARCHITECTURE

(71) Applicant: Bank of America Corporation, Charlotte, NC (US)

(72) Inventors: Pushkar Taneja, Hyderabad (IN); Sujatha Ambati, Hyderabad (IN); Shailendra Singh, Thane West (IN); Suryanarayana Adivi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 60 days.

(21) Appl. No.: 18/662,611

(22) Filed: May 13, 2024

(65) Prior Publication Data

US 2025/0348593 A1 Nov. 13, 2025

(51) Int. Cl.
*G06F 21/57* (2013.01)
*G06F 11/3604* (2025.01)

(52) U.S. Cl.
CPC ........ *G06F 21/577* (2013.01); *G06F 11/3604* (2013.01)

(58) Field of Classification Search
CPC ........................... G06F 21/577; G06F 11/3604
See application file for complete search history.

(56) References Cited

U.S. PATENT DOCUMENTS

| | | | |
|---|---|---|---|
| 10,114,954 B1 * | 10/2018 | Bellis ................... | G06F 21/577 |
| 10,581,974 B2 | 3/2020 | Sustaeta et al. | |
| 10,886,008 B2 | 1/2021 | Kamens et al. | |
| 11,045,271 B1 | 6/2021 | Tran | |
| 11,069,117 B2 | 7/2021 | Ford et al. | |
| 11,183,190 B2 | 11/2021 | Chae | |
| 11,431,660 B1 | 8/2022 | Leeds et al. | |
| 11,625,613 B2 | 4/2023 | Karras et al. | |
| 11,724,401 B2 | 8/2023 | Mousavian et al. | |
| 11,788,948 B2 | 10/2023 | Ota et al. | |

(Continued)

OTHER PUBLICATIONS

Pushkar Taneja, et al.; U.S. Appl. No. 18/662,721; "System and method for generating dynamic remote based isolation configurations based on application specific cyber threats;" filed May 13, 2024.

*Primary Examiner* — Azizul Choudhury

(57) ABSTRACT

A system includes a memory configured to store a set of application environment parameters associated with a software application of a plurality of software applications. The system further includes processors for accessing the set of application environment parameters associated with the software application, identifying, based on the set of application environment parameters, a plurality of potential threats and vulnerabilities associated with an execution of the software application in accordance with the current configuration, and executing one or more generative machine-learning models trained to generate a prediction of one or more cyber threat scenarios based on the set of application environment parameters and the plurality of potential threats and vulnerabilities. The prediction of the one or more cyber threat scenarios includes cyber threat scenarios specific to the software application. The processors further output, by the one or more generative machine-learning models, the prediction of the one or more cyber threat scenarios.

20 Claims, 4 Drawing Sheets

(56)         References Cited

U.S. PATENT DOCUMENTS

| | | | |
|---|---|---|---|
| 11,900,665 | B2 | 2/2024 | Das |
| 12,141,289 | B1 * | 11/2024 | McDonald .......... H04L 63/0263 |
| 2019/0129405 | A1 | 5/2019 | Cella et al. |
| 2019/0379682 | A1 | 12/2019 | Overby |
| 2020/0228880 | A1 | 7/2020 | Ravishankar et al. |
| 2021/0319894 | A1 | 10/2021 | Sobol et al. |
| 2021/0366586 | A1 | 11/2021 | Ryan et al. |
| 2022/0187847 | A1 | 6/2022 | Cella et al. |
| 2022/0210200 | A1 | 6/2022 | Crabtree et al. |
| 2022/0245574 | A1 | 8/2022 | Cella et al. |
| 2023/0135553 | A1 | 5/2023 | Cella et al. |
| 2024/0394376 | A1 * | 11/2024 | Kelly .................... G06F 21/577 |
| 2025/0005489 | A1 * | 1/2025 | Wuest ................... G06F 21/566 |
| 2025/0016128 | A1 * | 1/2025 | Wheeler ............... G06N 20/00 |
| 2025/0023714 | A1 * | 1/2025 | Kumar ................. H04L 9/0819 |
| 2025/0110706 | A1 * | 4/2025 | Votintseva ............... G06F 8/33 |
| 2025/0150340 | A1 * | 5/2025 | Waplington ............ H04L 41/16 |

* cited by examiner

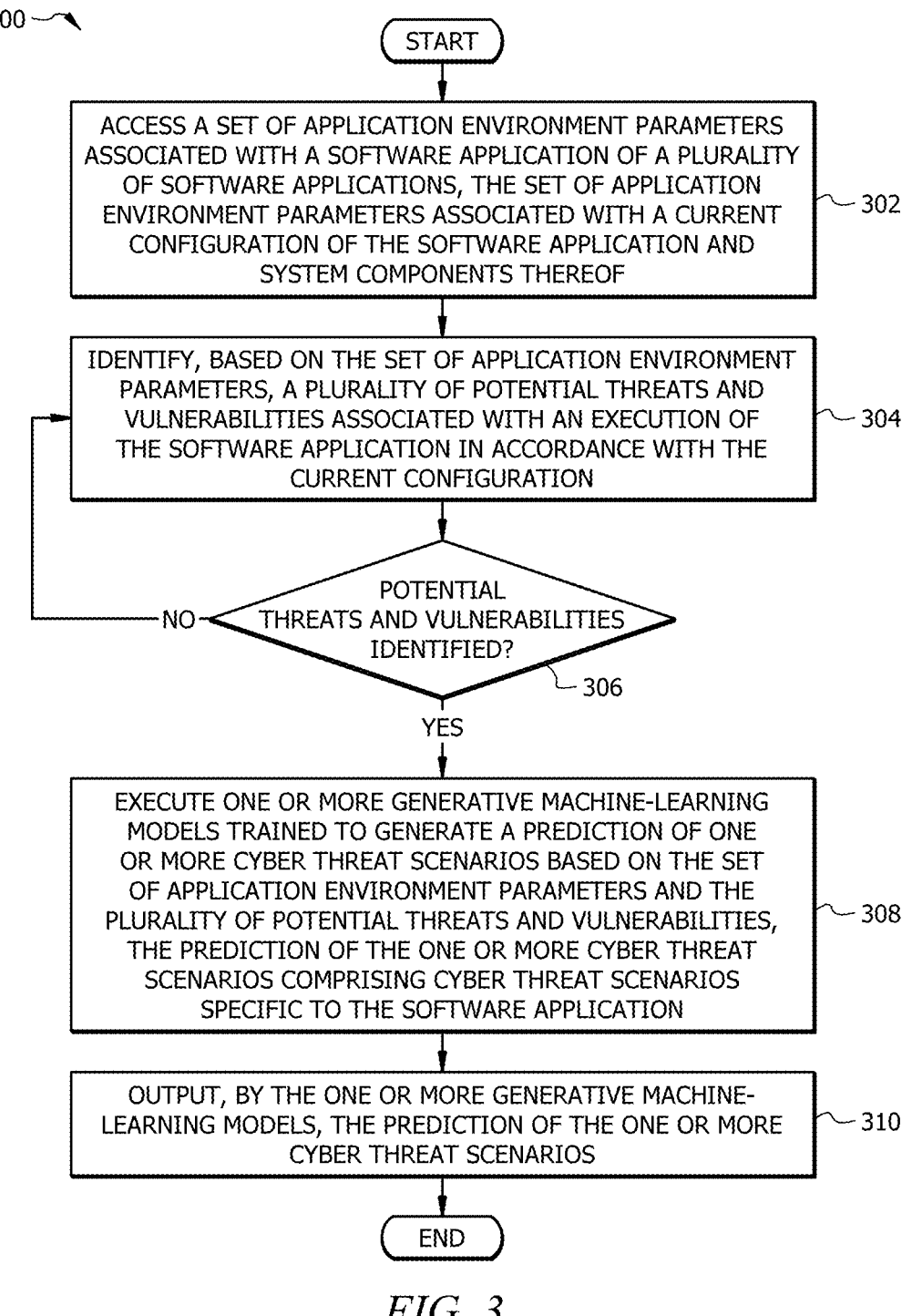

300

START

ACCESS A SET OF APPLICATION ENVIRONMENT PARAMETERS ASSOCIATED WITH A SOFTWARE APPLICATION OF A PLURALITY OF SOFTWARE APPLICATIONS, THE SET OF APPLICATION ENVIRONMENT PARAMETERS ASSOCIATED WITH A CURRENT CONFIGURATION OF THE SOFTWARE APPLICATION AND SYSTEM COMPONENTS THEREOF — 302

IDENTIFY, BASED ON THE SET OF APPLICATION ENVIRONMENT PARAMETERS, A PLURALITY OF POTENTIAL THREATS AND VULNERABILITIES ASSOCIATED WITH AN EXECUTION OF THE SOFTWARE APPLICATION IN ACCORDANCE WITH THE CURRENT CONFIGURATION — 304

POTENTIAL THREATS AND VULNERABILITIES IDENTIFIED? — 306

NO

YES

EXECUTE ONE OR MORE GENERATIVE MACHINE-LEARNING MODELS TRAINED TO GENERATE A PREDICTION OF ONE OR MORE CYBER THREAT SCENARIOS BASED ON THE SET OF APPLICATION ENVIRONMENT PARAMETERS AND THE PLURALITY OF POTENTIAL THREATS AND VULNERABILITIES, THE PREDICTION OF THE ONE OR MORE CYBER THREAT SCENARIOS COMPRISING CYBER THREAT SCENARIOS SPECIFIC TO THE SOFTWARE APPLICATION — 308

OUTPUT, BY THE ONE OR MORE GENERATIVE MACHINE-LEARNING MODELS, THE PREDICTION OF THE ONE OR MORE CYBER THREAT SCENARIOS — 310

END

*FIG. 3*

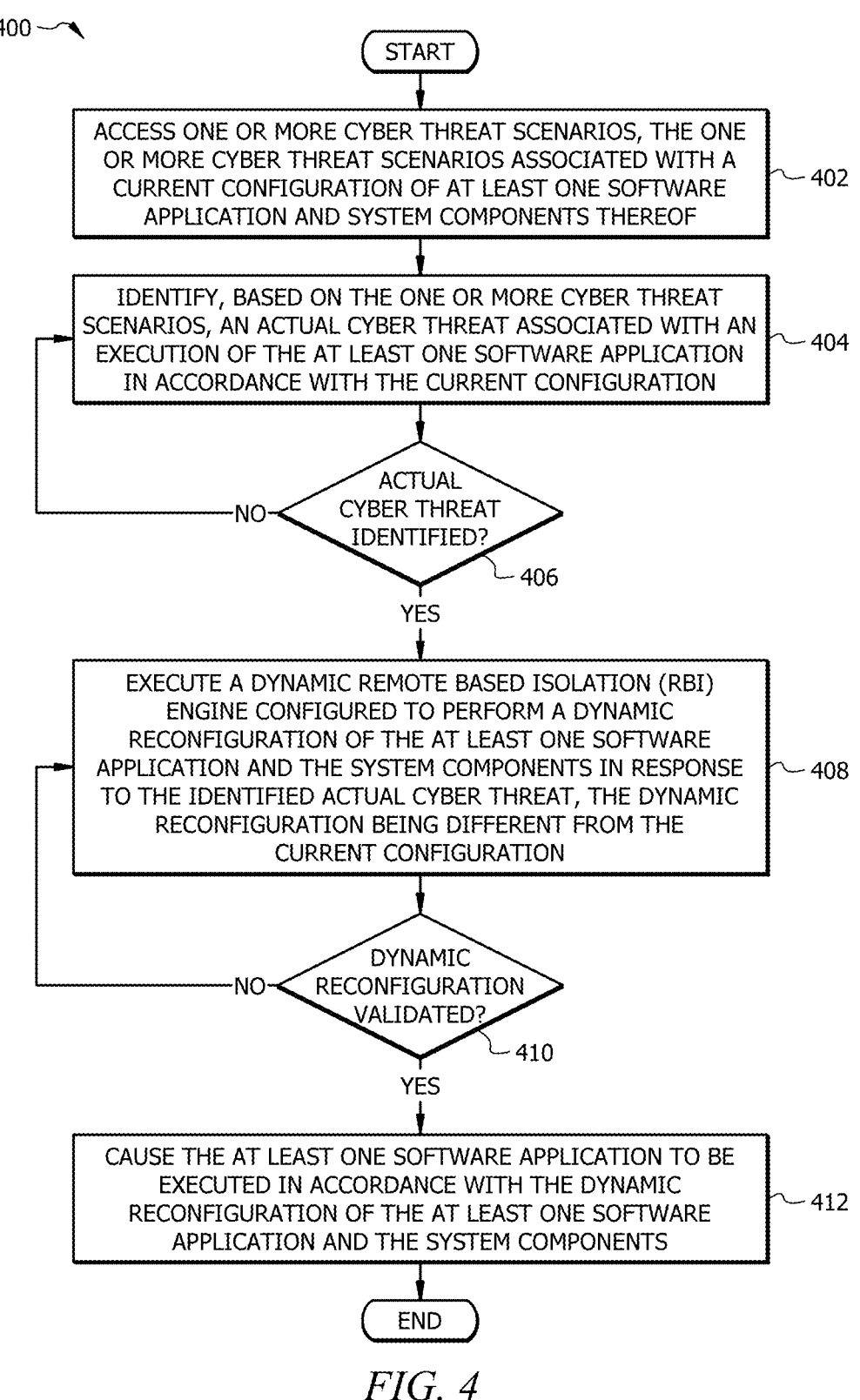

400

START

ACCESS ONE OR MORE CYBER THREAT SCENARIOS, THE ONE OR MORE CYBER THREAT SCENARIOS ASSOCIATED WITH A CURRENT CONFIGURATION OF AT LEAST ONE SOFTWARE APPLICATION AND SYSTEM COMPONENTS THEREOF ⟋402

IDENTIFY, BASED ON THE ONE OR MORE CYBER THREAT SCENARIOS, AN ACTUAL CYBER THREAT ASSOCIATED WITH AN EXECUTION OF THE AT LEAST ONE SOFTWARE APPLICATION IN ACCORDANCE WITH THE CURRENT CONFIGURATION ⟋404

ACTUAL CYBER THREAT IDENTIFIED? ⟋406

NO

YES

EXECUTE A DYNAMIC REMOTE BASED ISOLATION (RBI) ENGINE CONFIGURED TO PERFORM A DYNAMIC RECONFIGURATION OF THE AT LEAST ONE SOFTWARE APPLICATION AND THE SYSTEM COMPONENTS IN RESPONSE TO THE IDENTIFIED ACTUAL CYBER THREAT, THE DYNAMIC RECONFIGURATION BEING DIFFERENT FROM THE CURRENT CONFIGURATION ⟋408

DYNAMIC RECONFIGURATION VALIDATED? ⟋410

NO

YES

CAUSE THE AT LEAST ONE SOFTWARE APPLICATION TO BE EXECUTED IN ACCORDANCE WITH THE DYNAMIC RECONFIGURATION OF THE AT LEAST ONE SOFTWARE APPLICATION AND THE SYSTEM COMPONENTS ⟋412

END

*FIG. 4*

SYSTEM AND METHOD FOR GENERATING DYNAMIC CYBER THREAT MODELS BASED ON APPLICATION ARCHITECTURE

TECHNICAL FIELD

The present disclosure relates generally to computing security, and, more specifically, to a system and method for generating dynamic cyber threat models based on application architecture.

BACKGROUND

Certain web-based environments may include data stored across any number of databases and associated with any number of entities. For example, the data may include various user data or service data that may be stored to databases associated with respective entities, and that user data or service data may be accessed by any number of centralized or decentralized servers for servicing applications associated with various users. However, such web-based environments may be sometimes subjected to various threats and cyberattacks.

SUMMARY

The system and methods implemented by the system as disclosed in the present disclosure provide technical solutions to the technical problems discussed above by providing systems and methods for generating dynamic cyber threat models based on software application architecture. The disclosed system and methods provide several practical applications and technical advantages. Specifically, the present embodiments improve the security, reliability, and maintainability of software applications, systems, and sensitive user data, as well as the one or more processors and memory on which the software applications, systems, and sensitive user data may be executed and stored by providing a dynamic remote based isolation and threat detection system that utilizes one or more generative machine-learning models (e.g., generative artificial intelligence (AI) models) trained and executed to dynamically predict and generate threat scenarios based on the identified architecture and characteristics of the current software application and a data set of potential threats and vulnerabilities associated with the execution of the software application.

Thus, the present embodiments may identify, isolate, and preempt potential cyber threats, adversarial attacks, cyberattacks, data breaches, or other security vulnerabilities that may be associated with one or more industry-specific software applications, systems, and sensitive user data. Specifically, by predicting and generating threat scenarios based on the identified architecture and characteristics of the current software application and the data set of potential threats and vulnerabilities associated with the execution of the software application, the present embodiments may identify in real-time or near real-time threat scenarios specific and unique to a particular industry-specific software application and actively and dynamically reconfigure the particular industry-specific software application, system, or sensitive user data susceptible to the predicted and generated threat scenarios to prevent a potential data leak or other systemic vulnerability with respect to the software application, system, or sensitive user data.

The present embodiments are directed to systems and methods for generating dynamic cyber threat models based on software application architecture. In particular embodiments, a memory may be configured to store a set of application environment parameters associated with at least one software application of a plurality of software applications. For example, in one embodiment, the at least one software application may include one or more of a plurality of disparate industry-specific software applications. In particular embodiments, one or more processors operably coupled to the memory may be configured to access the set of application environment parameters associated with the at least one software application.

For example, in one embodiment, the set of application environment parameters associated with the at least one software application may include one or more dependencies associated with the at least one software application and the system components, one or more communication channels associated with the at least one software application and the system components, or one or more security requirements associated with the at least one software application and the system components. In particular embodiments, the one or more processors may be further configured to identify, based at least in part on the set of application environment parameters, a plurality of potential threats and vulnerabilities associated with an execution of the at least one software application in accordance with the current configuration.

In particular embodiments, the plurality of potential threats and vulnerabilities associated with an execution of the at least one software application may include one or more of a data set of historical cyber threats, a data set of cyberthreat intelligence (CTI) data, or a set of penetration testing results. In particular embodiments, the one or more processors may be further configured to execute one or more generative machine-learning models trained to generate a prediction of one or more cyber threat scenarios based at least in part on the set of application environment parameters and the plurality of potential threats and vulnerabilities. For example, in one embodiment, the prediction of the one or more cyber threat scenarios may include cyber threat scenarios specific to the at least one software application.

In particular embodiments, the one or more processors may be further configured to output, by the one or more generative machine-learning models, the prediction of the one or more cyber threat scenarios. For example, in one embodiment, the one or more generative machine-learning models may generate a recommendation for reconfiguring the at least one software application or the system components based at least in part on the prediction of the one or more cyber threat scenarios. In particular embodiments, the one or more generative machine-learning models may be trained based at least in part on one or more of the data set of historical cyber threats, the data set of CTI data, or the set of penetration testing results.

In particular embodiments, the one or more generative machine-learning model may include one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates a flowchart of an example method for generating dynamic cyber threat models based on application architecture, in accordance with one or more embodiments of the present disclosure.

FIG. 4 illustrates a flowchart of an example method for generating dynamic remote based isolation configurations based on application specific cyber threats, in accordance with one or more embodiments of the present disclosure.

DETAILED DESCRIPTION

Example System

Figure 1:
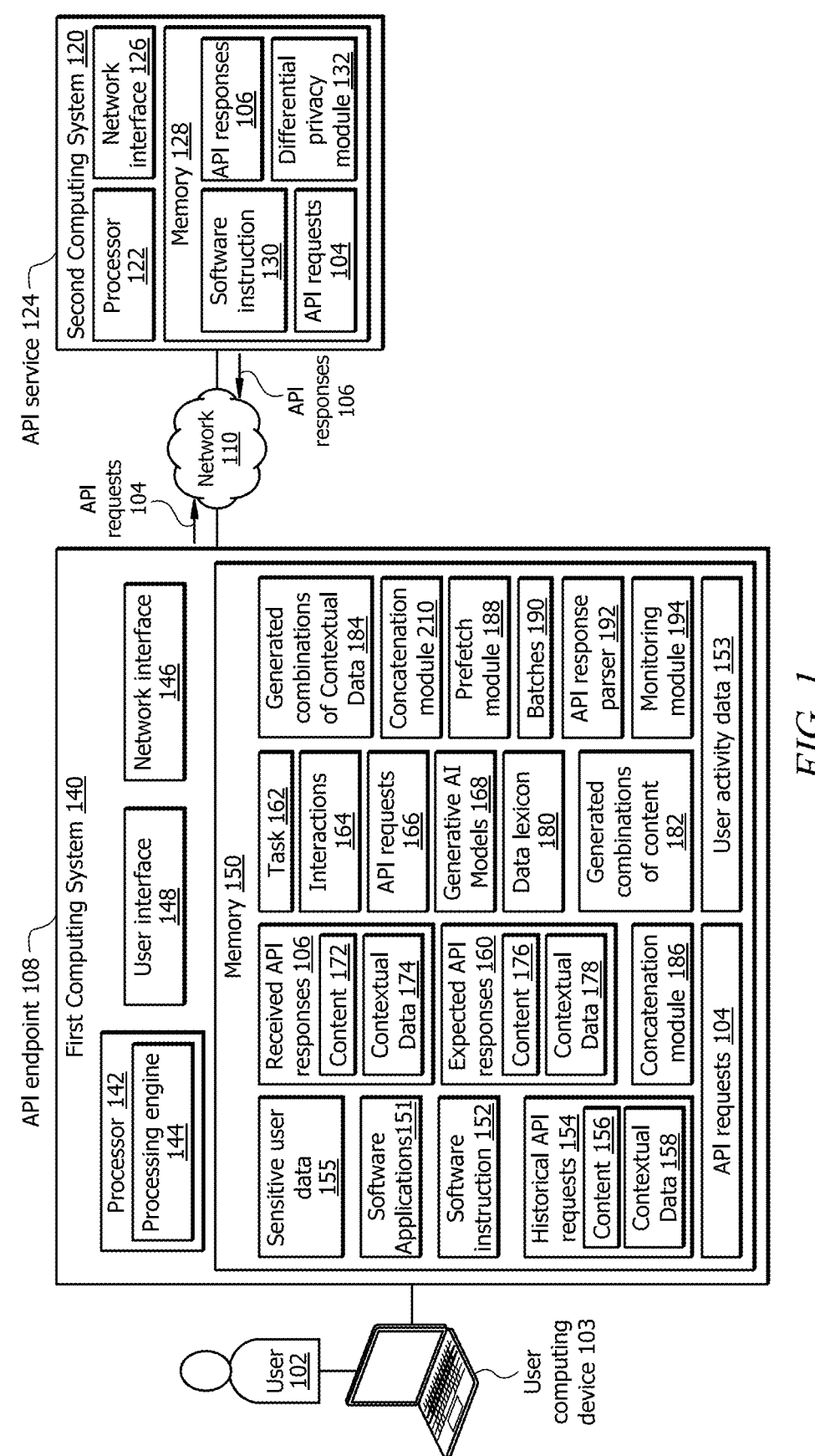
FIG. 1 is a block diagram of a system of a server and host computing system and network, in accordance with certain aspects of the present disclosure.

FIG. 1 is a block diagram of a computing system and network 100 that is configured to generate dynamic cyber threat models based on the identified architecture and characteristics of respective software applications 151, API services 124, API responses 106, and/or one or more system components, such as one or more of the user computing device 103, processor 142, the processing engine 144, the user interface 148, and the network interface 146 that may be associated with the execution of respective software applications 151. In one embodiment, the computing system and network 100 may include a first computing system 140. In some embodiments, the computing system and network 100 further may include a user 102, the user computing device 103, a network 110, and a second computing system 120.

In particular embodiments, the user 102 may be representative of any number of users associated with an institution, an organization, or an entity that has instantiated respective user profiles on the first computing system 140, and may be thus associated with sensitive user profile data 155. The sensitive user profile data 155 that may be associated with one or more of a large number of users internal or external to the institution, the organization, or the entity. The network 110 enables communications among components of the computing system and network 100. In other embodiments, the computing system and network 100 may not have all of the components listed and/or may have other elements instead of, or in addition to, those listed above.

In particular embodiments, the first computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to access a set of application environment parameters associated with a particular software application 151 of the number of respective software applications 151, in which the set of application environment parameters is associated with a current configuration of the particular software application 151 and the system components, such as one or more of the user computing device 103, processor 142, the processing engine 144, the user interface 148, and the network interface 146 that may be associated with the execution of respective software applications 151.

The processor 142 further identifies, based on the set of application environment parameters, a number of potential threats and vulnerabilities associated with an execution of the particular software application 151 in accordance with the current configuration. The processors 142 further executes one or more execute one or more generative machine-learning models 168 trained to generate a prediction of one or more cyber threat scenarios based on the set of application environment parameters and the number of potential threats and vulnerabilities, in which the prediction of the one or more cyber threat scenarios includes cyber threat scenarios specific to the particular software application 151. The processor 142 further outputs, by the one or more generative machine-learning models 168, the prediction of the one or more cyber threat scenarios.

In particular embodiments, the software instructions 152 when further executed by the processor 142, cause the processor 142 to perform one or more additional functions described herein. For example, when the software instructions 152 are executed, the processor 142 executes a processing engine 144 to access one or more cyber threat scenarios associated with a particular software application 151 of a number of respective software applications 151, the one or more cyber threat scenarios is specific to the particular software application 151.

The processor 142 further identifies, based on the one or more cyber threat scenarios, an actual cyber threat associated with an execution of the particular software application 151 in accordance with the current configuration. The processors 142 further executes a dynamic remote based isolation (RBI) engine configured to perform a dynamic reconfiguration of the particular software application 151 and the system components in response to the identified actual cyber threat. The dynamic reconfiguration may be different from the current configuration of the software application 151 and the system components. The processor 142 further cause the particular software application 151 to be executed in accordance with the dynamic reconfiguration of the particular software application 151 and the system components.

The computing system and network 100 may be configured as shown, or in any other configuration. In accordance with the presently disclosed embodiments, the first computing system 140 may be suitable for securing user data against internal cyber threats. In one embodiment, the first computing system 140 may include a centralized or decentralized server of an institution or organization suitable for hosting and servicing a large number of external users, as well as internal users, such as the user 102 while utilizing the user computing device 103. Similarly, the second computing system 120 may include third-party server or service that may be communicatively coupled to the first computing system 140 by way of the network 110.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In particular embodiments, the second computing system 120 is generally a computing device that is configured to process data and communicate with computing devices (e.g., the first computing system 140), databases, systems, etc., via the network 110 and may be associated with a second entity separate from the first entity in accordance with the presently disclosed embodiments. The second computing system 120 is generally configured to generate API responses 106 in response to receiving the API requests 104 and/or API requests 166. In particular embodiments, the second computing system 120 may include a processor 122 in signal communication with a network interface 126 and a memory 128. Memory 128 stores software instructions 130 that when executed by the processor 122, cause the second computing system 120 to perform one or more functions described herein. For example, when the software instructions 130 are executed, the second computing system 120 generates API responses 106 in response to receiving the API requests 104. The second computing system 120 may be configured as shown, or in any other configuration.

The processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

The network interface 126 is configured to enable wired and/or wireless communications (e.g., via the network 110). The network interface 126 is configured to communicate data between the second computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may comprise a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 130, API requests 104, API responses 106, differential privacy module 132, and/or any other data or instructions. The software instructions 130 may comprise any suitable set of instructions, logic, rules, or code operable to execute the processor 122.

The memory 128 may also store a second user data set 131 that may be associated with the second entity to which the second computing system 120 is associated. For example, in some embodiments, the second entity may include a second user profile configured to facilitate user interactions between the user 102 and a number of other users associated with the second entity, and thus the second user data set 131 may include any data associated with the user 102 and servicing and facilitating user interactions between the user 102 and a number of other users associated with the second entity and the second computing system 120.

First Computing System

In particular embodiments, the first computing system 140 is generally any computing device that is configured to process data and communicate with computing devices (e.g., second computing system 120), databases, systems, etc., via the network 110. The first computing system 140 is generally configured to oversee operations of the processing engine 144. The first computing system 140 is associated with an API endpoint 108 where API requests 104 are originated. In particular embodiments, the first computing system 140 may include the processor 142 in signal communication with a network interface 146, a user interface 148, and memory 150. The first computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the network interface 146, user interface 148, and memory 150. The one or more processors are configured to process data and may be implemented in hardware or software.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 146 is configured to enable wired and/or wireless communications (e.g., via the network 110). The network interface 146 is configured to communicate data between the first computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may include a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, historical API requests 154, API requests 104, concatenation module 186, prefetch module 188, received PAI responses 106, expected API responses 160, generated combinations of content 182, generated combination of contextual data 184, API requests 166, one or more generative machine-learning models 168, task 162, interactions 164, data lexicon 180, batches 190, API response parser 192, monitoring module 194, and/or any other data or instructions. The software instructions 152 may include any suitable set of instructions, logic, rules, or code operable to execute the processor 142.

The memory 150 may also store instances of a software application 151 that may be executing within the computing system and network 100. In one embodiment, the instances of a software application 151 may include any number of instances a large software application suitable for hosting and servicing millions or billions of individual users and that may also interact via API requests 104 and API responses 106 with the computing system 120.

Processing Engine

Processing engine 144 may be implemented by the processor 142 executing the software instructions 152, and is generally configured to access a set of application environment parameters associated with a particular software application 151 of the number of respective software applications 151, in which the set of application environment parameters is associated with a current configuration of the particular software application 151 and the system components, such as one or more of the user computing device 103, processor 142, the processing engine 144, the user interface 148, and the network interface 146 that may be associated with the execution of respective software applications 151.

The processor 142 further identifies, based on the set of application environment parameters, a number of potential threats and vulnerabilities associated with an execution of the particular software application 151 in accordance with the current configuration. The processors 142 further executes one or more execute one or more generative machine-learning models 168 trained to generate a prediction of one or more cyber threat scenarios based on the set of application environment parameters and the number of potential threats and vulnerabilities, in which the prediction of the one or more cyber threat scenarios includes cyber threat scenarios specific to the particular software application 151. The processor 142 further outputs, by the one or more generative machine-learning models 168, the prediction of the one or more cyber threat scenarios.

Processing engine 144 may be implemented by the processor 142 executing the software instructions 152, and may be further generally configured to access one or more cyber threat scenarios associated with a particular software application 151 of a number of respective software applications

151, the one or more cyber threat scenarios is specific to the particular software application 151.

The processor 142 further identifies, based on the one or more cyber threat scenarios, an actual cyber threat associated with an execution of the particular software application 151 in accordance with the current configuration. The processors 142 further executes a dynamic remote based isolation (RBI) engine configured to perform a dynamic reconfiguration of the particular software application 151 and the system components in response to the identified actual cyber threat. The dynamic reconfiguration may be different from the current configuration of the software application 151 and the system components. The processor 142 further cause the particular software application 151 to be executed in accordance with the dynamic reconfiguration of the particular software application 151 and the system components.

The processing engine 144 accesses historical API requests 154. The processing engine 144 generates one or more API requests 104 based on content 156 and contextual data 158 associated with the historical API requests 154. The processing engine 144 sends the API requests 104 to the second computing system 120. The second computing system 120 generates API responses 106 to the received API requests 104. The second computing system 120 sends the API responses 106 to the first computing system 140.

The processing engine 144 parses the API responses 106 and detects content 172 and contextual data 174 associated with the API responses 106. The processing engine 144 compares each received API responses 106 with a counterpart expected API response 160, where each received API responses 106 and the counterpart expected API response 160 is associated with the same API requests 104 and/or task 162, such as generating a user account number.

The processing engine 144 determines whether a received API responses 106 corresponds with its counterpart expected API response 160. If the processing engine 144 determines that the received API responses 106 does not correspond with the counterpart expected API response 160, the processing engine 144 identifies the difference between the received API responses 106 and the counterpart expected API response 160. In other words, the processing engine 144 identifies interactions 164 made to the received API responses 106, where the interactions 164 is made to the received API responses 106 by the second computing system 120. In response, the processing engine 144 may update future API requests 166 associated with the particular task 162 according to the interactions 164 made to the received API responses 106.

Generating Combinations of Content and Contextual Data

The operational flow may begin at a training generation step where the processing engine 144 accesses the historical API requests 154, e.g., stored in the memory 150.

Each historical API request 154 may include content 156 and contextual data 158. For example, the content 156 associated with a historical API request 154 may include the data that is requested in the historical API request 154. In an example historical API request 154 that requests to generate a user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API requests 104. One reason for generating API requests 104 is to generate different combinations or different possibilities of content 182 and contextual data 184. Each combination of content 182 and contextual data 184 corresponds to one API requests 104. In this manner, the processing engine 144 is able to detect any interactions 164 made to any aspect of the process of generating API responses 106 compared to expected API responses 160.

In particular embodiments, the processing engine 144 may monitor the user activity and interaction data 153. In this process, the processing engine 144 may execute the one or more generative machine-learning models 168, such as one or more of a language model (LM), a large language model (LLM), one or more transformer-based machine-learning models, one or more sequence-to-sequence (Seq2Sec) models, or other one or more generative machine-learning models 168. In particular embodiments, the interactions 164 may include user interaction data captured in relation to a live natural language exchange session conducted electronically between the user 102 and an external user. In particular embodiments, the processing engine 144 may further train the one or more generative machine-learning models 168 based on the user activity and interaction data 153, interactions 164, and the architecture and characteristics associated with respective software applications 151, and cyberthreat intelligence (CTI) data.

In one embodiment, the processing engine 144 may implement a random data generator for generating combinations of content 182 and combinations of contextual data 184. The processing engine 144 may vary the content 156 and the contextual data 158 among one or more API requests 104. In the example of an API request 104 for generating a user account number for a user, to generate the combinations of content 182, the processing engine 144 may vary different data fields of the content 156, such as names, addresses, phone numbers, use account numbers, number of digits used in the user account numbers, etc. associated with the historical API requests 154. In the example of an API requests 104 for generating a user account number for a user, to generate the combinations of contextual data 184, the processing engine 144 may vary different data fields of the contextual data 158, such as headers, trailers, URLs, data formats, etc. associated with the historical API requests 154.

In some cases, a data field in content 182 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon 180 that includes data that is predefined and/or not generated synthetically and/or randomly. The processing engine 144 may fetch such data from the data lexicon 180 and use it in the various combinations of content 182 and various combinations of contextual data 184.

Generating API Requests

At the execution operation, the processing engine 144 feeds the generated combinations of content 182 and combinations of contextual data 184 to the concatenation module 186.

The concatenation module 186 may be implemented by the processor 142 executing the software instructions 152, and further is generally configured to generate the API requests 104. In this process, the concatenation module 186 may concatenate each generated content 182 with each generated contextual data 184. Each combination of generated content 182 with a generated contextual data 184 may represent one of the API requests 104. The concatenation module 186 may feed the API requests 104 to the prefetch module 188.

The prefetch module 188 may be implemented by the processor 142 executing the software instructions 152, and further is generally configured to place the API requests 104 in batches 190. Each batch 190 may include fifty, one-hundred, or any other number of API requests 104. API requests 104 in each batch 190 may be associated with a particular one of the API services 124, e.g., generating user account numbers, etc.

The prefetch module 188 may determine whether the API requests 104 are compatible with the API services 124 of the destination second computing system 120, so that no error message is expected to be received from the second computing system 120. If the prefetch module 188 determines that the API requests 104 (in a first batch 190) are valid and compatible with the desired API service of the API services 124, the prefetch module 188 communicates the API requests 104 (in a first batch 190) to the second computing system 120.

In one embodiment, while the second computing system 120 is processing the API requests 104 (in the first batch 190), the prefetch module 188 may prefetch and prepare the next batch 190 of API requests 104 to send to the second computing system 120. The prefetch module 188 may continue this process for the next batches 190.

Generating API Responses

The second computing system 120 receives the API requests 104 at the differential privacy module 132. The differential privacy module 132 may be implemented by the processor 122 executing the software instructions 130, and further is generally configured to determine whether each of the API requests 104 is valid.

In one embodiment, the differential privacy module 132 may determine whether an API requests 104 is valid by determining whether it has originated from a pre-authenticated endpoint. If the differential privacy module 132 determines that an API request 104 is valid, it sends the API requests 104 to the processor 122 for processing. Otherwise, in one embodiment, the differential privacy module 132 may not forward the API requests 104 to the processor 122. In another embodiment, the differential privacy module 132 may return an error message to an originator of the invalid API requests 104. Thus, if the API requests 104 is determined to be invalid, the second computing system 120 may not generate an API response for it.

In this manner, the computing system and network 100 of FIG. 1 may be integrated into a practical application of improving information security and data loss prevention. For example, a bad actor may attempt to gain unauthorized access to the second computing system 120 by sending an API request 104. By detecting that the API requests 104 is invalid, data stored in the second computing system 120 may be kept secure from unauthorized access.

The processor 122 receives the validated API requests 104 and process them. The processor 122 generates an API responses 106 for each validated API requests 104. For example, if the API requests 104 includes a request to generate a user account number, the API responses 106 to this API requests 104 includes the generated user account number. The processor 122 communicates the API responses 106 to the differential privacy module 132.

Receiving API Responses

The differential privacy module 132 communicates the API responses 106 to the prefetch module 188. The prefetch module 188 may be implemented by the processor 142 executing the software instruction 152, and further is generally configured to parse each API responses 106. In one embodiment, the prefetch module 188 implemented a text parsing algorithm, such as natural language processing. In one embodiment, the prefetch module 188 may implement object-oriented programming and treat each data field in the API responses 106 as an object. The prefetch module 188 may include a content parser and a contextual data parser. The content parser may parse the contents 172 of the API responses 106. The contextual data parser may parse the contextual data 174 of the API responses 106. The prefetch module 188 forwards the content 172 and contextual data 174 to the monitoring module 194.

Generating Dynamic Cyber Threat Models Based on Application Architecture

Embodiments of the present disclosure discuss techniques for generating dynamic cyber threat models based on application architecture.

Figure 2:
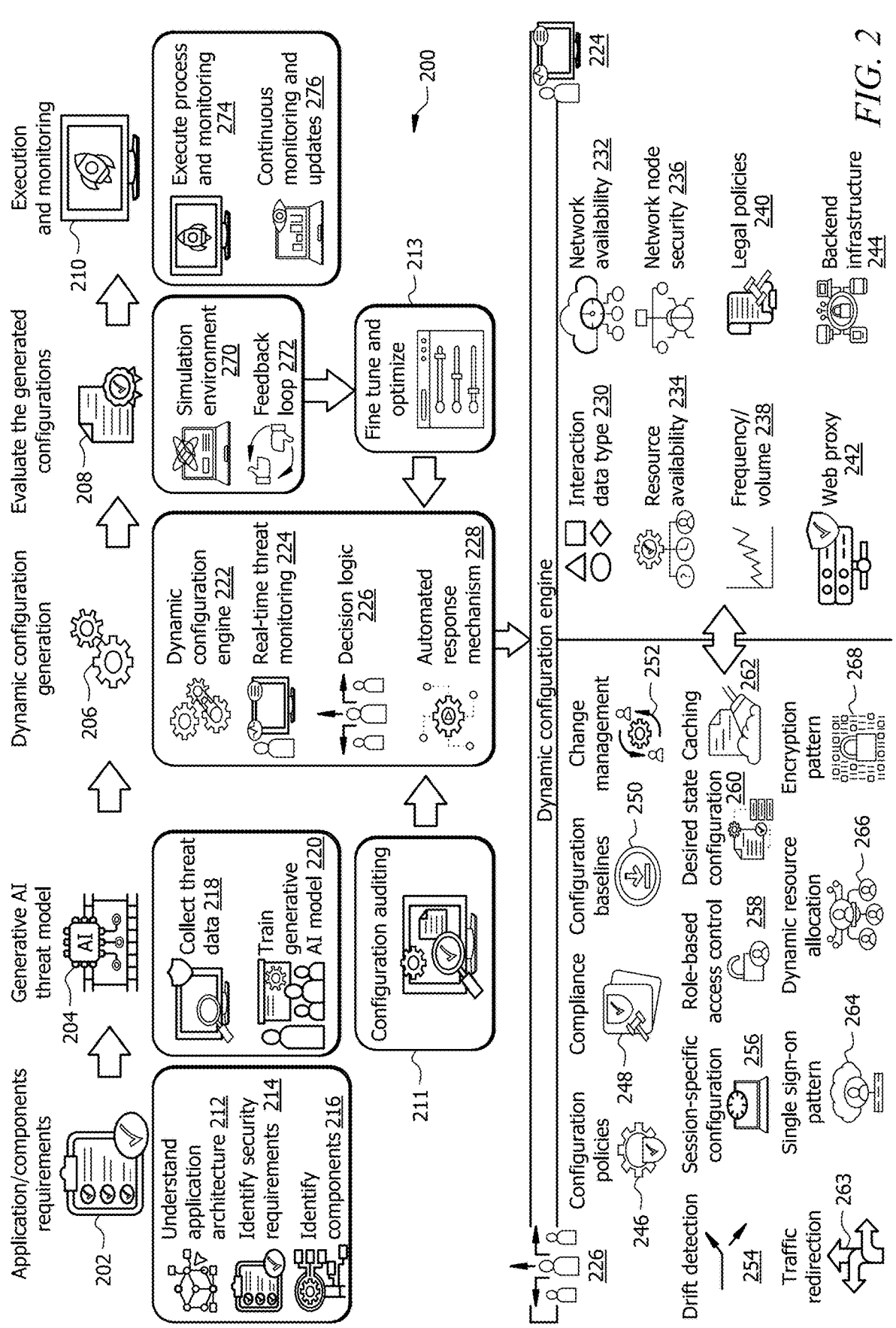
FIG. 2 illustrates a workflow diagram of an embodiment of an insider threat detection system for securing user data against internal cyber threats, in accordance with one or more embodiments of the present disclosure.

FIG. 2 illustrates a workflow diagram of an embodiment of a dynamic remote based isolation and threat detection system 200 for generating dynamic cyber threat models based on application architecture, in accordance with certain aspects of the present disclosure. In particular embodiments, the workflow of the dynamic remote based isolation and threat detection system 200 may be performed utilizing the first computing system 140 as described above with respect to FIG. 1. As depicted, the workflow of the dynamic remote based isolation and threat detection system 200 may begin with accessing a set of application environment parameters 202 associated with a particular software application, such as one of the software applications 151. For example, in one embodiment, the particular software application 151 may include one or more of a number of disparate industry-specific software applications (e.g., a banking software application, a patient healthcare application, an e-commerce software application, a finance software application, a technology sector software application, and so forth).

In particular embodiments, as further depicted by FIG. 2, the set of application environment parameters 202 may include a comprehensive knowledge of the software application architecture 212, such as one or more dependencies associated with the particular software application 151 and the system components 216 (e.g., software components, hardware components, or a combination software and hardware components) thereof, one or more communication channels associated with the particular software application 151 and the system components 216, or one or more sets of security requirements 214 associated with the particular software application 151 and the system components 216. In particular embodiments, the workflow of the dynamic remote based isolation and threat detection system 200 may then proceed with the identifying a number of potential threats and vulnerabilities associated with an execution of the particular software application 151 in its current configuration.

For example, in one embodiment, the dynamic remote based isolation and threat detection system 200 may receive a data set of raw cyberthreat data 218, such as historical cyber threats, cyberthreat intelligence (CTI) data feeds (e.g., indicators of compromise (IoCs) of common cyberattacks, cybersecurity news, detailed analyses of malwares, web-based postings or messages surrounding emerging cyber-threats), a set of penetration testing results (e.g., "pen tests"), and so forth. In particular embodiments, the workflow of the dynamic remote based isolation and threat detection system 200 may then proceed with executing one or more generative machine-learning models 204 trained to generate a prediction of one or more cyber threat scenarios based the set of application environment parameters 202 and the data set of raw cyberthreat data 218. For example, in accordance with the presently disclosed embodiments, the prediction of the one or more cyber threat scenarios may be specific to the particular software application 151.

In particular embodiments, the one or more generative machine-learning models 204 may include one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained transformer (GPT) model, or other similar trained generative machine-learning model(s) 220 that may be suitable for generating a prediction of one or more cyber threat scenarios that are specific to the particular software application 151.

In particular embodiments, the workflow of the dynamic remote based isolation and threat detection system 200 may then proceed with providing the prediction of the one or more cyber threat scenarios to a dynamic configuration generation system 206. In particular embodiments, the dynamic configuration generation system 206 may include a dynamic remote based isolation (RBI) engine 222 that may be utilized to perform a dynamic reconfiguration of the particular software application 151 and the system components 216 in response to an identified actual cyber threat. For example, in one embodiment, the actual cyber threat may be identified based on the prediction of one or more cyber threat scenarios as generated by the one or more generative machine-learning models 204.

In particular embodiments, as further depicted by FIG. 2, the dynamic RBI engine 222 may also include a real-time threat monitoring component 224 that may be suitable for continuously analyzing the security posture of the particular software application 151 to detect potential random threats, such as intrusions, anomalies, cyberthreat intelligence (CTI) feeds, and so forth. For example, in particular embodiments, the real-time threat monitoring component 224 may continuously analyze the security posture of the particular software application 151 by monitoring and analyzing one or more of an interaction data type 230, a communications network availability 232, a processing and memory resources availability 234, a network node security 236, a data frequency and volume 238, one or more legal policies 240, web-based proxy server 242, and backend infrastructure 244.

In particular embodiments, as further depicted by FIG. 2, the dynamic RBI engine 222 may also include a decision logic component 226 suitable for assessing the current threat landscape in accordance with application specific policies and compliances and generating real-time or near real-time decisions as to how the dynamic RBI engine 222 is to reconfigure the particular software application 151 and the system components 216. For example, the decision logic component 226 may determine as to how the dynamic RBI engine 222 is to reconfigure the particular software application 151 and the system components 216 in accordance with one or more of configuration policies 246, compliances 248, configuration baselines 250, a change or reconfiguration management 252, a drift direction 254, a session-specific configuration 256, a role-based access control 258, a desired state configuration 260, a caching 262, a data traffic redirection 263, a single sign-on pattern 264, a dynamic resource allocation 266, and an encryption pattern 268.

In particular embodiments, upon the decision logic component 226 determining as to how the dynamic RBI engine 222 is to reconfigure the particular software application 151 and the system components 216, the automated response mechanism 228 may be utilized to implement and carry out the dynamic reconfiguration of the software application 151 and the system components 216 by, for example, performing one or more of a scaling of resources, a data traffic redirection, a session specific configuration, an encryption patterning, an adjustment of access controls, or a deployment of additional security features.

In particular embodiments, the workflow of the dynamic remote based isolation and threat detection system 200 may then proceed with a testing and validation simulation 208 of the dynamic reconfiguration of the particular software application 151 and the system components 216. For example, in particular embodiments, the testing and validation simulation 208 may include generating a simulation environment 270 to test and validate the dynamic reconfiguration of the particular software application 151 and the system components 216 under various threat scenarios, such as the predicted one or more threat scenarios as generated by the one or more generative machine-learning models 204. For example, the simulation environment 270 may be utilized to validate the effectiveness of the dynamic reconfiguration of the particular software application 151 and the system components 216 in responding to different types of cyber threats.

In particular embodiments, the testing and validation simulation 208 may further include establishing a feedback loop 272 between the dynamic RBI engine 222 and the one or more generative machine-learning models 204. For example, the feedback loop 272 between the dynamic RBI engine 222 and the one or more generative machine-learning models 204 may ensure continuous learning and improvement based on the evolving threat landscape. In particular embodiments, the workflow of the dynamic remote based isolation and threat detection system 200 may then proceed with an execution 210 of the dynamic reconfiguration of the particular software application 151 and the system components 216. For example, in particular embodiments, the execution 210 of the dynamic reconfiguration of the particular software application 151 and the system components 216 may include executing one or more execution and monitoring processes 274 and continuous and monitoring updates 276.

In particular embodiments, executing the one or more execution and monitoring processes 274 may include causing the particular software application 151 and the system components 216 to be executed in accordance with the dynamic reconfiguration of the particular software application 151 and the system components 216 initially within a controlled application environment before being deployed. In particular embodiments, the workflow of the dynamic remote based isolation and threat detection system 200 may then proceed with a fine-tuning and optimization 213 of the one or more generative machine-learning models 204 based on learnings of the dynamic reconfiguration of the particular software application 151 and the system components 216 once having been deployed.

In particular embodiments, the workflow of the dynamic remote based isolation and threat detection system 200 may then conclude with a configuration auditing 211 of the one or more generative machine-learning models 204 and the dynamic RBI engine 222. For example, in one embodiment, the configuration auditing 211 may include a continuous logging, auditing, and reviewing of the performances of the one or more generative machine-learning models 204 and the dynamic RBI engine 222.

Thus, in accordance with the presently disclosed embodiments, the dynamic remote based isolation and threat detection system 200 may improve the security, reliability, and maintainability of software applications, systems, and sensitive user data, as well as the one or more processors and memory on which the software applications, systems, and sensitive user data may be executed and stored by providing a dynamic remote based isolation and threat detection system that utilizes one or more generative machine-learning models (e.g., generative artificial intelligence (AI) models) trained and executed to dynamically predict and generate threat scenarios based on the identified architecture and characteristics of the current software application and a data set of potential threats and vulnerabilities associated with the execution of the software application.

Thus, the present embodiments may identify, isolate, and preempt potential cyber threats, adversarial attacks, cyberattacks, data breaches, or other security vulnerabilities that may be associated with one or more industry-specific software applications, systems, and sensitive user data. Specifically, by predicting and generating threat scenarios based on the identified architecture and characteristics of the current software application and the data set of potential threats and vulnerabilities associated with the execution of the software application, the present embodiments may identify in real-time or near real-time threat scenarios specific and unique to a particular industry-specific software application and actively and dynamically reconfigure the particular industry-specific software application, system, or sensitive user data susceptible to the predicted and generated threat scenarios to prevent a potential data leak or other systemic vulnerability with respect to the software application, system, or sensitive user data.

In accordance with the presently disclosed embodiments, the dynamic remote based isolation and threat detection system 200 may further improve the security, reliability, and maintainability of software applications, systems, and sensitive user data, as well as the one or more processors and memory on which the software applications, systems, and sensitive user data may be executed and stored by providing a dynamic remote based isolation and threat detection system that includes a dynamic remote based isolation (RBI) configuration engine that dynamically adapts configurations of a particular software application and system components thereof based on threat scenarios or real-time or near real-time cyberthreat intelligence (CTI) specific to the particular software application. For example, the dynamic remote based isolation (RBI) configuration engine may compensate for both the one or more predicted threat scenarios, as well as real-time or near real-time actual cyber threat.

Accordingly, the present embodiments may identify, isolate, and preempt potential cyber threats, adversarial attacks, cyberattacks, data breaches, or other security vulnerabilities that may be associated with one or more industry-specific software applications, systems, and sensitive user data. Specifically, by dynamically reconfiguring the particular software application and the system components thereof based on threat scenarios or real-time or near real-time cyberthreat intelligence (CTI) specific to the particular software application, the present embodiments may actively and dynamically reconfigure the particular industry-specific software application, system, or sensitive user data susceptible to the predicted one or more threat scenarios and actual cyber threat to prevent a potential data leak or other systemic vulnerability with respect to the software application, system, or sensitive user data.

FIG. 3 illustrates a flowchart of an example method 300 for generating dynamic cyber threat models based on application architecture, in accordance with one or more embodiments of the present disclosure. The method 300 may be performed utilizing the first computing system 140 as described above with respect to FIG. 1. The method 300 may begin at block 302 with the first computing system 140 accessing a set of application environment parameters associated with at least one software application of a plurality of software applications. In one embodiment, the set of application environment parameters 202 (e.g., application architecture 212, security requirements 214, system components 216) may be associated with a current configuration of a software application 151 and system components (e.g., first computing system 140, second computing system 120) thereof.

The method 300 may then continue at block 304 with the first computing system 140 identifying, based at least in part on the set of application environment parameters, a plurality of potential threats and vulnerabilities associated with an execution of the at least one software application in accordance with the current configuration. For example, in one embodiment, the potential threats and vulnerabilities associated with the execution of the software application 151 may include a data set of raw cyberthreat data 218, such as historical cyber threats, cyberthreat intelligence (CTI) data feeds (e.g., indicators of compromise (IoCs) of common cyberattacks, cybersecurity news, detailed analyses of malwares, web-based postings or messages surrounding emerging cyberthreats), a set of penetration testing results (e.g., "pen tests"), and so forth.

The method 300 may then continue at decision 306 with the first computing system 140 confirming whether the plurality of potential threats and vulnerabilities associated with an execution of the at least one software application has been identified. For example, in response to determining that the plurality of potential threats and vulnerabilities associated with an execution of the at least one software application has not been identified, the method 300 may return to block 304 as discussed above. In response to determining that the plurality of potential threats and vulnerabilities associated with an execution of the at least one software application has been identified, the method 300 may then continue at block 308 with the first computing system 140 executing one or more generative machine-learning models trained to generate a prediction of one or more cyber threat scenarios based at least in part on the set of application environment parameters and the plurality of potential threats and vulnerabilities.

In particular embodiments, the prediction of the one or more cyber threat scenarios may include cyber threat scenarios specific to the at least one software application. For example, in accordance with the presently disclosed embodiments, the one or more generative machine-learning models 204 may be utilized to dynamically predict and generate threat scenarios specific to a particular software application 151 based on the set of application environment parameters 202 (e.g., application architecture 212, security requirements 214, system components 216) and the data set of raw cyberthreat data 218. The method 300 may then conclude at block 310 with the first computing system 140 outputting, by the one or more generative machine-learning models, the prediction of the one or more cyber threat scenarios.

For example, in particular embodiments, the one or more generative machine-learning models 204 may output a prediction of one or more threat scenarios that is specific to the particular software application 151. In one embodiment, the one or more generative machine-learning models 204 may further output a recommendation for reconfiguring the particular software application 151 or the system 140, 120 based on the prediction of the one or more cyber threat scenarios. For example, in one embodiment, the one or more generative machine-learning models 204 may output the recommendation for reconfiguring the particular software application 151 or the system 140, 120 to the dynamic configuration generation system 206.

In this way, the present embodiments may identify, isolate, and preempt potential cyber threats, adversarial attacks, cyberattacks, data breaches, or other security vulnerabilities that may be associated with one or more industry-specific software applications 151, system 140, 120, and sensitive user data 155. Specifically, by predicting and generating threat scenarios based on the based on the set of application environment parameters 202 (e.g., application architecture 212, security requirements 214, system components 216) and the data set of raw cyberthreat data 218, the present embodiments may identify in real-time or near real-time threat scenarios specific and unique to a particular industry-specific software application 151 and actively and dynamically reconfigure the particular software application 151, system 140, 120, or sensitive user data 155 susceptible to the predicted and generated threat scenarios to prevent a potential data leak or other systemic vulnerability with respect to the particular software application 151, system 140, 120, or sensitive user data 155.

FIG. 4 illustrates a flowchart of an example method 400 for generating dynamic remote based isolation configurations based on application specific cyber threats, in accordance with one or more embodiments of the present disclosure. The method 400 may be performed utilizing the first computing system 140 as described above with respect to FIG. 1. The method 400 may begin at block 402 with the first computing system 140 accessing one or more cyber threat scenarios associated with at least one software application of a plurality of software applications. In particular embodiments, the one or more cyber threat scenarios may be specific to a particular software application 151 and system components thereof. For example, in one embodiment, the one or more cyber threat scenarios may be associated with a current configuration of a particular software application 151 and system components thereof. In particular embodiments, the one or more cyber threat scenarios may correspond to the one or more cyber threat scenarios generated by the one or more generative machine-learning models 204 as discussed above with respect to the method 300 of FIG. 3.

The method 400 may continue at block 404 with the first computing system 140 identifying, based at least in part on the one or more cyber threat scenarios, an actual cyber threat associated with an execution of the at least one software application in accordance with the current configuration. For example, in one embodiment, the one or more cyber threat scenarios may be associated with a current configuration of a particular software application 151 and system components thereof. The method 400 may then continue at decision 406 with the first computing system 140 determining whether the actual cyber threat has been identified. For example, in response to determining that the actual cyber threat has not been identified, the method 400 may return to block 404 as discussed above.

On the other hand, in response to determining that the actual cyber threat has been identified, the method 400 may then continue at block 408 with the first computing system 140 executing a dynamic remote based isolation (RBI) engine configured to perform a dynamic reconfiguration of the at least one software application and the system components in response to the identified actual cyber threat. Specifically, the dynamic reconfiguration may be a change in configuration that renders the particular software application 151 and system components thereof different from the current configuration of the particular software application 151 and the system components thereof in response to the identified actual cyber threat.

For example, in particular embodiments, the dynamic remote based isolation (RBI) engine 222 may be configured to perform the dynamic reconfiguration of the particular software application 151 and the system components by performing one or more of a scaling of resources, a data traffic redirection, a session specific configuration, an encryption patterning, an adjustment of access controls, or a deployment of additional security features. In particular embodiments, the dynamic remote based isolation (RBI) engine 222 may include a real-time or near real-time threat monitoring component 224 that may be utilized to continuously analyze a security posture of the particular software application 151 based on the actual cyber threat. In particular embodiments, the dynamic remote based isolation (RBI) engine 222 may further include a decision logic component 226 that may be utilized to determine whether to perform the dynamic reconfiguration of the particular software application 151 and the system components thereof based on one or more predetermined policy features or compliance features.

The method 400 may then continue at decision 410 with the first computing system 140 determining whether the dynamic reconfiguration has been validated. For example, in particular embodiments, as previously discussed above with respect to FIG. 2, prior to causing the particular software application 151 to be executed in accordance with the dynamic reconfiguration, a testing and validation simulation 208 of the dynamic reconfiguration of the particular software application 151 may be executed to evaluate the dynamic reconfiguration with respect to, for example, the one or more cyber threat scenarios as generated by the generative machine-learning models 204 or any of various other potential cyber threats.

In response to determining that the dynamic reconfiguration has not been validated, the method 400 may return to block 408 as discussed above. On the other hand, in response to determining that the dynamic reconfiguration has been validated, the method 400 may then conclude at block 412 with the first computing system 140 causing the at least one software application to be executed in accordance with the dynamic reconfiguration of the at least one software application and the system components. Specifically, upon the dynamic reconfiguration as generated by the dynamic remote based isolation (RBI) engine 222 being successfully tested and validated, the dynamic reconfiguration may be then executed and deployed to change the current configuration of the particular software application 151 and the systems components thereof to be response to the actual cyber threat, as well as the one or more predicted cyber threat scenarios.

In this way, the present embodiments may identify, isolate, and preempt potential cyber threats, adversarial attacks, cyberattacks, data breaches, or other security vulnerabilities that may be associated with one or more industry-specific software applications, systems, and sensitive user data. Specifically, by dynamically reconfiguring the particular software application and the system components thereof based on threat scenarios or real-time or near real-time cyberthreat intelligence (CTI) specific to the particular software application, the present embodiments may actively and dynamically reconfigure the particular industry-specific software application, system, or sensitive user data susceptible to the predicted one or more threat scenarios and actual cyber threat to prevent a potential data leak or other systemic vulnerability with respect to the software application, system, or sensitive user data.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory configured to store a set of application environment parameters associated with at least one software application of a plurality of software applications, wherein the set of application environment parameters is associated with a first configuration of the at least one software application and system components thereof, and wherein the at least one software application comprises a first industry-specific software application of a plurality of industry-specific software applications; and one or more processors operably coupled to the memory and configured to:

access the set of application environment parameters associated with the first industry-specific software application;

identify, based at least in part on the set of application environment parameters, a plurality of potential threats and vulnerabilities associated with an execution of the first industry-specific software application in accordance with the first configuration;

execute one or more generative machine-learning models trained to generate a prediction of one or more cyberthreat scenarios based at least in part on the set of application environment parameters and the plurality of potential threats and vulnerabilities, the prediction of one or more cyberthreat scenarios comprising cyberthreat scenarios associated with an industry-specific context corresponding to the first industry-specific software application;

output, by the one or more generative machine-learning models, the prediction of one or more cyberthreat scenarios; and reconfigure, based at least in part on the outputted prediction of one or more cyberthreat scenarios, the first industry-specific software application and the system components in accordance with a second configuration, wherein the second configuration is different from the first configuration.

2. The system of claim 1, wherein the set of application environment parameters associated with the at least one software application comprises one or more dependencies associated with the at least one software application and the system components, one or more communication channels associated with the at least one software application and the system components, or one or more security requirements associated with the at least one software application and the system components.

3. The system of claim 1, wherein the at least one software application comprises one or more of a plurality of disparate industry-specific software applications.

4. The system of claim 1, wherein the one or more processors are further configured to generate a recommendation for reconfiguring the at least one software application or the system components based at least in part on the prediction of the one or more cyberthreat scenarios.

5. The system of claim 1, wherein the one or more processors are further configured to identify the potential threats and vulnerabilities associated with the execution of the at least one software application based at least in part on one or more of a data set of historical cyber threats, a data set of cyber threat intelligence (CTI) data, or a set of penetration testing results.

6. The system of claim 5, wherein the one or more processors are further configured to:

prior to executing the one or more generative machine-learning models, train the one or more generative machine-learning models based at least in part on one or more of the data set of historical cyber threats, the data set of CTI data, or the set of penetration testing results.

7. The system of claim 1, wherein the one or more generative machine-learning model comprises one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

8. A method, comprising:

accessing a set of application environment parameters associated with at least one software application of a plurality of software applications, wherein the set of application environment parameters is associated with a first configuration of the at least one software application and system components thereof, and wherein the at least one software application comprises a first industry-specific software application of a plurality of industry-specific software applications;

identifying, based at least in part on the set of application environment parameters, a plurality of potential threats and vulnerabilities associated with an execution of the first industry-specific software application in accordance with the first configuration;

executing one or more generative machine-learning models trained to generate a prediction of one or more cyberthreat scenarios based at least in part on the set of application environment parameters and the plurality of potential threats and vulnerabilities, the prediction of one or more cyberthreat scenarios comprising cyberthreat scenarios associated with an industry-specific context corresponding to the first industry-specific software application;

outputting, by the one or more generative machine-learning models, the prediction of one or more cyberthreat scenarios; and reconfiguring, based at least in part on the outputted prediction of one or more cyberthreat scenarios, the first industry-specific software application and the system components in accordance with a second configuration, wherein the second configuration is different from the first configuration.

9. The method of claim 8, wherein the set of application environment parameters associated with the at least one software application comprises one or more dependencies associated with the at least one software application and the system components, one or more communication channels associated with the at least one software application and the system components, or one or more security requirements associated with the at least one software application and the system components.

10. The method of claim 8, wherein the at least one software application comprises one or more of a plurality of disparate industry-specific software applications.

11. The method of claim 8, further comprising generating a recommendation for reconfiguring the at least one software application or the system components based at least in part on the prediction of the one or more cyberthreat scenarios.

12. The method of claim 8, further comprising identifying the potential threats and vulnerabilities associated with the execution of the at least one software application based at least in part on one or more of a data set of historical cyber threats, a data set of cyber threat intelligence (CTI) data, or a set of penetration testing results.

13. The method of claim 12, further comprising prior to executing the one or more generative machine-learning models, training the one or more generative machine-learning models based at least in part on one or more of the data set of historical cyber threats, the data set of CTI data, or the set of penetration testing results.

14. The method of claim 8, wherein the one or more generative machine-learning model comprises one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

15. A non-transitory computer-readable medium storing instructions that, when executed by one or more processors, cause the one or more processors to:

access a set of application environment parameters associated with at least one software application of a plurality of software applications, wherein the set of application environment parameters is associated with a first configuration of the at least one software application and system components thereof, and wherein the at least one software application comprises a first industry-specific software application of a plurality of industry-specific software applications;

identifying, based at least in part on the set of application environment parameters, a plurality of potential threats and vulnerabilities associated with an execution of the first industry-specific software application in accordance with the first configuration;

execute one or more generative machine-learning models trained to generate a prediction of one or more cyberthreat scenarios based at least in part on the set of application environment parameters and the plurality of potential threats and vulnerabilities, the prediction of one or more cyberthreat scenarios comprising cyberthreat scenarios associated with an industry-specific context corresponding to the first industry-specific software application;

output, by the one or more generative machine-learning models, the prediction of one or more cyberthreat scenarios; and reconfigure, based at least in part on the outputted prediction of one or more cyberthreat scenarios, the first industry-specific software application and the system components in accordance with a second configuration, wherein the second configuration is different from the first configuration.

16. The non-transitory computer-readable medium of claim 15, wherein the set of application environment parameters associated with the at least one software application comprises one or more dependencies associated with the at least one software application and the system components, one or more communication channels associated with the at least one software application and the system components, or one or more security requirements associated with the at least one software application and the system components.

17. The non-transitory computer-readable medium of claim 15, wherein the at least one software application comprises one or more of a plurality of disparate industry-specific software applications.

18. The non-transitory computer-readable medium of claim 15, wherein the instructions cause the one or more processors to generate a recommendation for reconfiguring the at least one software application or the system components based at least in part on the prediction of the one or more cyberthreat scenarios.

19. The non-transitory computer-readable medium of claim 15, wherein the instructions further cause the one or more processors to identify the potential threats and vulnerabilities associated with the execution of the at least one software application based at least in part on one or more of a data set of historical cyber threats, a data set of cyber threat intelligence (CTI) data, or a set of penetration testing results.

20. The non-transitory computer-readable medium of claim 19, wherein the instructions further cause the one or more processors to:

prior to executing the one or more generative machine-learning models, train the one or more generative machine-learning models based at least in part on one or more of the data set of historical cyber threats, the data set of CTI data, or the set of penetration testing results.

* * * * *